United States Patent Office.

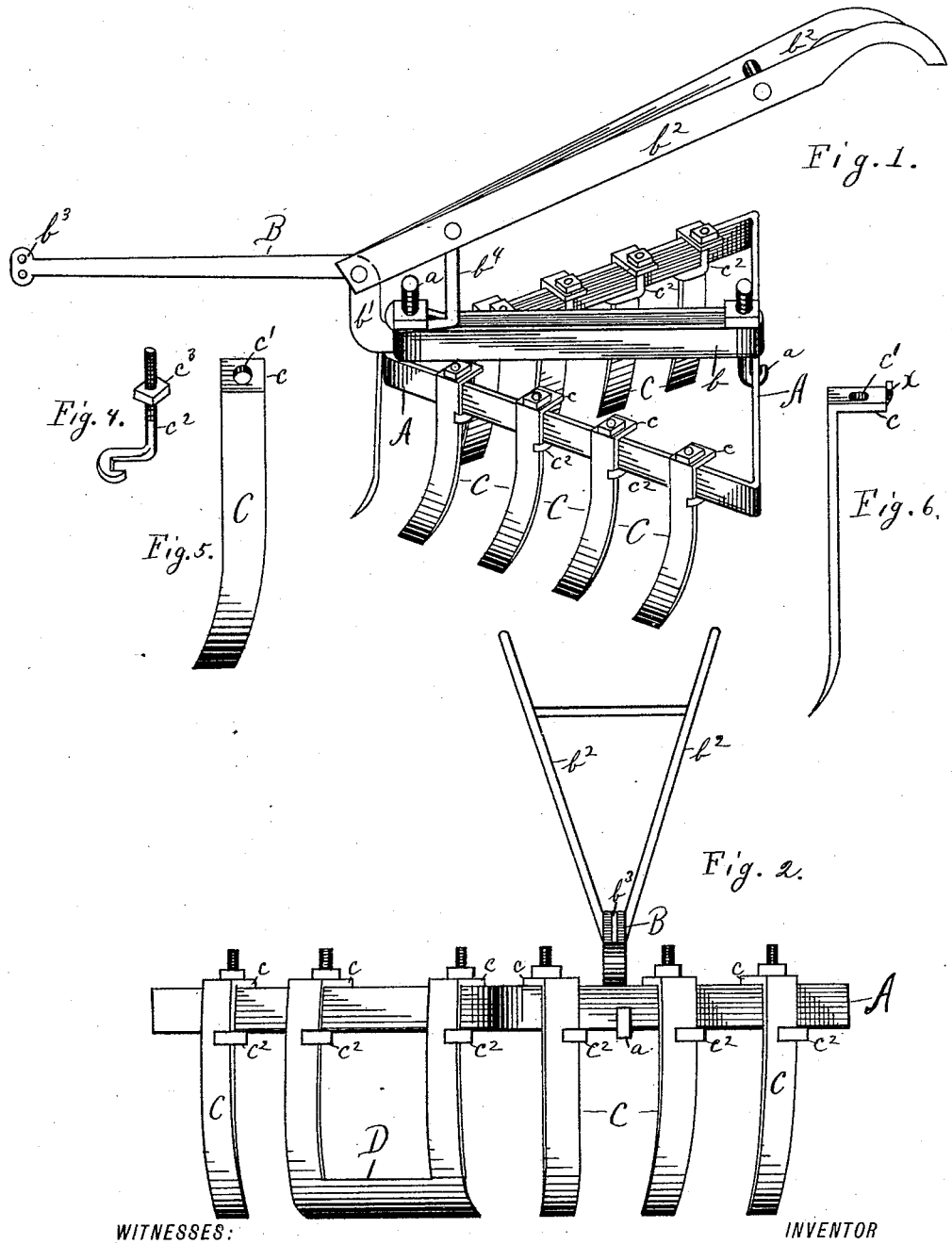

MARTIN BIRD GOOING, OF HAROLDTON, ASSIGNOR OF ONE-HALF TO JAMES F. GOODING, OF VAN BUREN, ARKANSAS.

HARROW AND CULTIVATOR.

SPECIFICATION forming part of Letters Patent No. 452,641, dated May 19, 1891.

Application filed December 12, 1890. Serial No. 374,449. (No model.)

*To all whom it may concern:*

Be it known that I, MARTIN BIRD GOOING, a citizen of the United States, residing at Haroldton, in the county of Crawford and State of Arkansas, have invented certain new and useful Improvements in Harrows and Cultivators; and I do declare the following to be a full, clear, and exact description of the invention, such as will enable others skilled in the art to which it appertains to make and use the same, reference being had to the accompanying drawings, and to the letters of reference marked thereon, which forms a part of this specifiation.

My invention has relation to combination harrows and cultivators; and it consists in the novel construction and arrangement of its parts.

In the accompanying drawings, Figure 1 is a perspective view of my invention. Fig. 2 is a front view showing the scraper D and showing the front part of the frame A set to the right of the beam B. Figs. 4, 5, and 6 are detail views.

My invention is described as follows:

It consists of the frame A, made in the shape of a triangle, to the upper edge of which is attached by means of the threaded hooks and nuts $a$ the slotted shank $b$ of the beam B. Said beam has an elbow $b'$ about its middle, to the upper part of which is attached the lower ends of the handles $b^2$, and the free end of said beam terminates in the clevis $b^3$. Said handles $b^2$ are provided with the brace $b^4$, the lower end of which is looped and bent at right angles, and through said loop passes the threaded hook $a$.

Said invention is further provided with the teeth C, the upper ends of which have the angular extensions $c$, provided with the perforations $c'$, and their lower ends are shaped in any desired form. Said teeth are attached to the frame A by means of the threaded hooks $c^2$. Said hooks consist of a threaded shank, the lower end turning squarely to the right or left and then turning back, forming a hook. The lower end passes down and under the lower edge of the frame A, and the hook grasps the edge of the tooth, and the upper end passes through the perforation $c'$ of said tooth and is secured by a nut $c^3$. The tooth shown in Fig. 6 is adapted to be used on the front of the triangle, and it is provided with a lug $x$, which fits in the slot of shank $b$ to keep it from turning. It will be seen that the teeth may be attached to or detached from the frame A at will, or they may be arranged on the three sides of the said frame to suit the nature of the soil or the pleasure of the operator. The beam B may also be shifted in various positions on the said frame.

Having described my invention, what I claim as new, and desire to secure by Letters Patent, is—

1. A harrow consisting of the triangular frame A, beam B, having the slotted shank $b$, threaded hooks and nuts $a$, working in said slotted shank and under the frame A, brace $b^4$, supporting the handles, teeth C, having the perforated angular extensions $c$, threaded hooks and nuts $c^2$ $c^3$, adapted to hold said teeth in position on the frame, and front tooth having the lug $x$, all substantially as shown and described, and for the purposes set forth.

2. In combination with a harrow, substantially as described, the teeth C, having the angular perforated extensions $c$, hooks $c^2$, having the threaded neck, elbow-arm, and hook, and nut $c^3$, substantially as shown and described, and for the purposes set forth.

In testimony whereof I affix my signature in presence of two witnesses.

MARTIN BIRD GOOING.

Witnesses
F. R. MCKIBBEN,
W. A. MORRIS.